United States Patent [19]
Yoshida et al.

[11] Patent Number: 5,357,498
[45] Date of Patent: Oct. 18, 1994

[54] DISC DRIVE APPARATUS THAT POSITIONS AN OBJECTIVE LENS WITHIN A DISC CARTRIDGE AT THE TIME WHEN THE DISC IS ROTATED

[75] Inventors: Tadao Yoshida, Kanagawa; Hirotoshi Fujisawa, Tokyo, both of Japan

[73] Assignee: Sony Corporation, Tokyo, Japan

[21] Appl. No.: 923,968
[22] PCT Filed: Jan. 16, 1992
[86] PCT No.: PCT/JP92/00029
    § 371 Date: Sep. 14, 1992
    § 102(e) Date: Sep. 14, 1992
[87] PCT Pub. No.: WO92/13342
    PCT Pub. Date: Jun. 8, 1992

[30] Foreign Application Priority Data
    Jan. 25, 1991 [JP] Japan .................. 3-025569

[51] Int. Cl.⁵ ............................. G11B 7/085
[52] U.S. Cl. ..................... 369/106; 369/44.14; 369/77.2
[58] Field of Search ............. 369/106, 44.14, 44.16, 369/215, 219, 77.2, 220, 244, 249, 256

[56] References Cited
    U.S. PATENT DOCUMENTS 4,682,322  7/1987  Ohta ........................... 369/291
    4,868,802  9/1989  Kobori ......................... 369/13
    4,916,684  4/1990  Odawara et al. ................. 369/43
    5,097,456  3/1992  Tanoshima et al. ............... 369/44.15
    5,136,558  8/1992  Getreuer et al. ................ 369/44.15
    5,150,343  9/1992  Goto et al. .................... 369/44.22
    5,224,079  6/1993  Inoue .......................... 369/13

FOREIGN PATENT DOCUMENTS
    0202655  11/1986  European Pat. Off. .

Primary Examiner—Paul M. Dzierzynski
Assistant Examiner—David V. Bruce
Attorney, Agent, or Firm—Philip M. Shaw, Jr.; Mark C. Pickering

[57] ABSTRACT

A recording and/or reproducing apparatus is disclosed in which informational signals are recorded and/or reproduced by irradiating an optical disc 202 with a light beam from an optical pick-up device 1 through an recording and/or reproducing opening 205 which is formed in a disc cartridge 202 which rotatably houses an optical disc 203. The optical pick-up device 1 which is used for the recording and/or reproducing apparatus comprises a light source and an objective lens 5 for converging the light beam from the light source upon the signal recording area of the optical disc 203. When recording and/or reproducing of informational signal on and/or from the optical disc 203 is performed by the optical pick-up device 1, only the objective lens 5 is moved into the disc cartridge 202 via the recording and/or reproducing opening 205 formed on the disc cartridge 202 to shorten the distance between the objective lens 5 of the optical pick-up device 1 and the disc 203.

7 Claims, 3 Drawing Sheets

DISC DRIVE APPARATUS THAT POSITIONS AN OBJECTIVE LENS WITHIN A DISC CARTRIDGE AT THE TIME WHEN THE DISC IS ROTATED

FIELD OF THE INVENTION

The present invention relates to a recording and/or reproducing apparatus and, in particular, a recording and/or reproducing apparatus that positions the objective lens within the disc cartridge when the disc is rotated.

BACKGROUND TECHNOLOGY

Discs such as magneto-optical discs or optical discs have heretofore been used as recording media of informational signals. A disc 101, as shown in FIG. 1, comprises a disc-shaped disc substrate made of a material having a light transmitting ability and a signal recording layer which is formed on at least one side of the disc substrate. When recording and/or reproducing informational signals on the disc 101, the disc 101 is loaded in a recording and/or reproducing apparatus. The disc 101 is supported at the center thereof by a disc rotating drive mechanism 102 disposed in the recording and/or reproducing apparatus and is driven to rotate around its center by the same mechanism 102. Accordingly, the signal recording layer is formed on a peripheral area which is located outside of the portion supported by the disc rotating drive mechanism 102.

Writing to the disc 101 or reading from on the disc 101 is carried out by an optical pick-up device 103 disposed in the recording and/or reproducing apparatus. The optical pick up device 103 comprises a light source and an objective lens 104 disposed at a point on an optical axis for condensing a light beam emitted from the light source so that the light beam from the light source is converged upon the signal recording portion of the disc 101. In other words, the light beam which is emitted from the light source and is impinged upon the signal recording portion of the disc 101 via the objective lens 104 is controlled in such a manner that it is constantly focussed upon the signal recording portion of the disc 101.

When an informational signal is recorded on a magneto-optical disc having a signal recording layer made of a magneto-optical material, an external magnetic field generating device is needed to apply an external magnetic field to the signal recording layer in addition to the optical pick-up device.

The optical pick up device 103 is provided with an objective lens drive mechanism 109 for moving the objective lens 104 in two directions including an axial direction and a direction perpendicular to the axial direction so that the light beam emitted from the light source is constantly focussed upon the signal recording portion of the disc 101 even when the surface of the disc 101 is oscillated or the disc 101 is eccentrically moved due to the rotation by the disc rotating drive mechanism 102. The objective lens drive mechanism 109 supports the objective lens 104 on a supporting member (not shown) in such a manner that the objective lens 104 is movable in an optically axial direction and in a direction perpendicular to the optical axis. In addition, the objective lens drive mechanism 109 drives the objective lens 104 along an optical axis and in a direction perpendicular to the optical axis by means of an electromagnetic actuator.

To protect the disc 101 from being contaminated with dust or being damaged from handling the disc 101 is housed in a disc cartridge 108 as shown in FIGS. 1 and 2 which is formed as a box-shaped cartridge main body 105. The disc cartridge 108 houses the disc 101 so that the disc 101 can be rotated within the cartridge main body 105. The cartridge main body 105 which houses the disc 101 therein is provided on at least one main side thereof with a recording and/or reproducing opening 106 through which at least a part of a signal recording area of the disc 101 is exposed in a radial direction, and a chucking opening 107 through which the central portion of the disc 101 formed with a center hole is exposed. Accordingly, the disc 101 housed in the disc cartridge 108 is supported from the center hole and is rotated by the disc rotating drive mechanism 102 through the chucking opening 107. Writing and/or reading of informational signals is carried out by the optical pick-up device 103 which faces to the disc 101 through the recording and/or reproducing opening 106.

The recording and/or reproducing opening 106 which is formed on the cartridge main body 105 is closed by a shutter member (not shown) that protects the disc 101 when not in use. The shutter member has a shutter portion which is formed to close at least the recording and/or reproducing opening 106 and is movable in such a direction that it opens and closes the recording and/or reproducing opening 106, and which is supported on the cartridge main body 105. Accordingly, the shutter member is moved to a position in which it closes the recording and/or reproducing opening 106 when the disc cartridge 108 is not in use while it is moved by a shutter opening mechanism to an open position when the disc cartridge 108 is loaded in the recording and/or reproducing apparatus.

In the above mentioned recording and/or reproducing apparatus, the distance between the objective lens 104 and a first surface of disc 101 faced by the objective lens 104 i.e. the working distance, is determined by the optical characteristics of the objective lens 104 of the optical pick up device. In order to make the density of the informational signals which are written to and/or read from the signal recording layer higher, it is necessary to converge a light beam B on the signal recording layer as a smaller spot. At this end, the working distance is made as short as possible so long as no problem arises in the design and manufacture of the objective lens 104.

Since the working distance is made as short as possible, the objective lens 104 must be brought as close as possible to the disc 101. As shown in FIG. 1, the objective lens drive mechanism 109 has a diameter which is larger than the outer diameter of the objective lens 104.

Thus, in order to place the objective lens drive mechanism 109 within the cartridge main body 105, it is therefore necessary to form the cartridge main body 105 with a recording and or reproducing opening 106 that is large enough to enable the objective lens drive mechanism 109 to move into the cartridge main body 105.

If a larger recording and/or reproducing opening 106 is formed in order to meet the above mentioned requirements, it is also necessary to provide a larger shutter member for opening and closing the recording and/or reproducing opening 106. This makes it difficult to provide a compact disc cartridge 108 since the shutter member is movably supported by the cartridge main body 105 so that it opens and closes the recording and/or reproducing opening 106 as mentioned above. If the recording and/or reproducing opening 106 is made larger, it becomes very difficult to form a flat main side of the disc cartridge since the cartridge main body 105 is formed of a synthetic resin by a molding method such as injection molding using an injection molding machine.

SUMMARY OF THE INVENTION

The present invention provides a disc drive apparatus that records and/or reproduces informational signals on an optical disc which is housed within a disc cartridge by extending a lens through a narrow disc opening in the disc cartridge only when the optical disc is rotated. The disc opening is exposed when the disc cartridge is loaded into the disc drive apparatus.

In accordance with the present invention, the disc drive apparatus includes a disc table that is connectable to the optical disc when the optical disc is loaded into the disc drive apparatus. Driving means are utilized to rotate the disc table.

The disc drive apparatus further includes an optical pick-up device that has a light source and an objective lens. The objective lens converges the light beam from the light source upon a signal recording area of the optical disc along an optical axis. Lifting means are utilized to move the objective lens into the disc cartridge through the narrow disc opening when the disc table is rotated. The cartridge opening is elongated, with its length extending radially of the disc and its width being only slightly larger than the diameter of the objective lens. The cartridge includes a shutter closing member which is in the shape of the cartridge opening.

A better understanding of the features and advantages of the present invention will be obtained by reference to the following detailed description and accompanying drawings which set forth an illustrative embodiment in which the principles of the invention are utilized.

DISCLOSURE OF THE INVENTION

The present invention provides a recording and/or reproducing apparatus for recording and/or reproducing informational signal on and/or from on optical disc by irradiating said optical disc with a light beam from an optical pick-up device through an opening formed on a disc cartridge which houses the optical disc in such manner that the optical disc is rotatable, in which the optical pick-up device comprises a light source and an objective lens which converges the light beam from the light source upon a signal recording area of said optical disc; and in which only the objective lens is moved into the disc cartridge through the opening of the disc cartridge when recording and/or reproducing of informational signals on and/or from the optical disc is performed by means of the optical pick-up device.

DETAILED DESCRIPTION OF THE INVENTION

Figure 1:
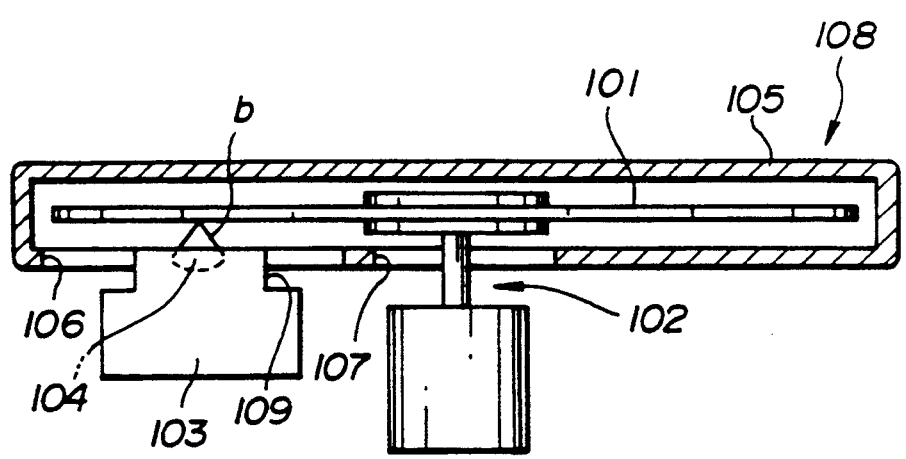
FIG. 1 is a longitudinal sectional view showing an optical pick up device of an prior art recording and/or reproducing apparatus and a disc cartridge which is used for the recording and/or reproducing apparatus.
Figure 2:
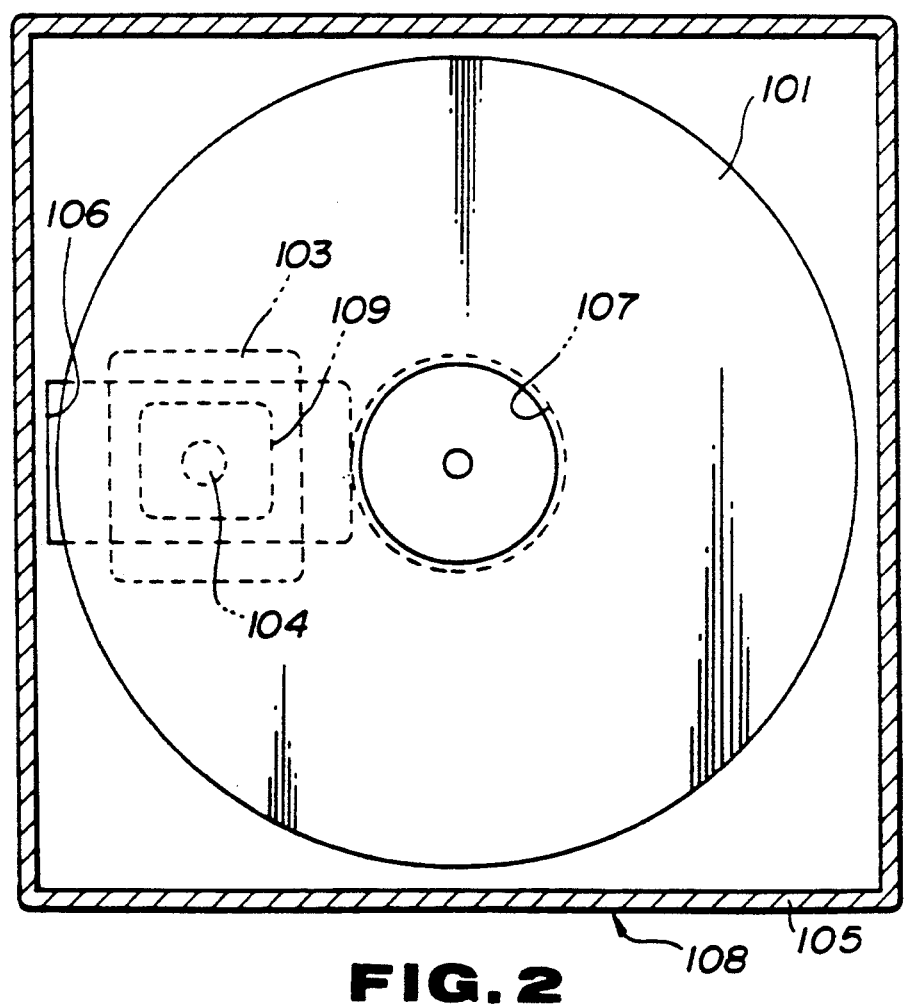
FIG. 2 is a plan view showing the structure of the optical pick up device and the disc cartridge of the prior art recording and/or reproducing apparatus.
Figure 3:
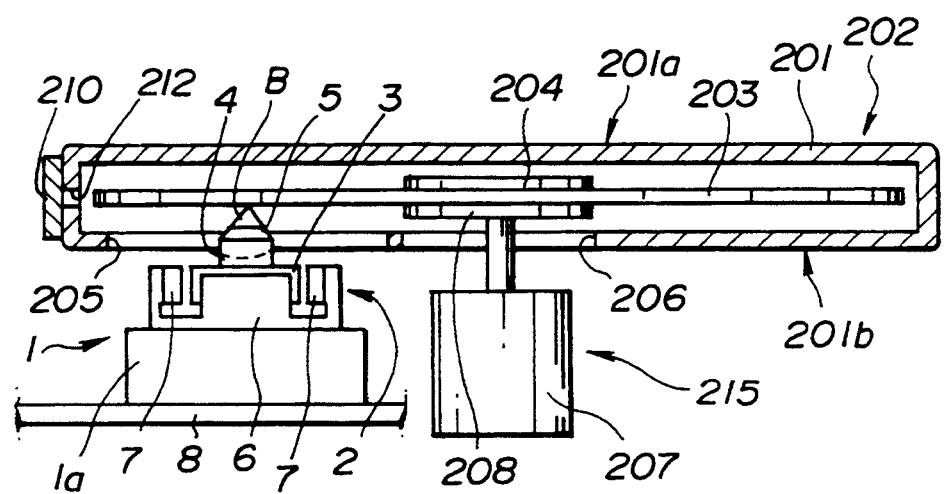
FIG. 3 is a longitudinal sectional view showing an optical pick up device forming a recording and/or reproducing apparatus of the present invention and a disc cartridge used for the recording and/or reproducing apparatus.

An embodiment of the present invention will be described with reference to the drawings.

A recording and/or reproducing apparatus of the present invention comprises an optical disc 203 which is is housed in a cartridge main body 201 to form a disc cartridge 202. The disc cartridge 202 is loaded in the recording and/or reproducing apparatus while the disc 203 is housed in the cartridge main body 201. The recording and/or reproducing apparatus uses an optical pick-up device 1 as a means for recording and/or reproducing information signals on the disc 203.

The optical pick-up device 1 has an optical block unit 1a which is supported on a guide member 8 disposed in the recording and/or reproducing apparatus. Optical block unit 1a includes a light source, such as a laser diode, and an optical device, such as collimator lens, for directing a light beam emitted from the light source to an objective lens 5. The optical block unit 1a is supported in such a manner that the optical block unit 1a is movable in a radial direction of the disc 203 through the guide member 8 by drive means (not shown) when the disc cartridge 202 is loaded on the recording and/or reproducing apparatus.

An objective lens drive device 2 is mounted on the optical block unit 1a. The objective lens drive device 2 has the objective lens 5 upon which the light beam emitted from the light source in the optical block unit 1a is incident. The objective lens drive apparatus 2 also includes a magnetic yoke 6 to which a plurality of magnets 7 are mounted, and a lens bobbin 3 that supports the objective lens 5. The magnetic yoke 6 is secured to the optical block 1a.

The lens bobbin 3 is supported on a support member such as wire or leaf spring (not shown) which is made of an elastic material so that the support member is displaced relative to the magnetic yoke 6. Solenoids (not shown) are mounted on the lens bobbin in a position opposite to the magnets 7. When a drive current responsive to a focus error signal or a tracking error signal is supplied to the solenoids, the lens bobbin 3 is driven in a focussing direction i.e., along the optical axis of the objective lens 5 represented by an arrow F in FIG. 5, and in a tracking direction normal to the optical axis, respectively by the action between the magnetic force formed by the drive current and the magnetic fields formed by the magnets 7. A d.c. drive signal, which is superimposed upon the focussing and tracking signals, is supplied to the solenoids of the objective lens drive device 2 to move the objective lens 5 into the disc cartridge 202.

The objective lens 5 is mounted on the lens bobbin 3 so that an objective lens support member 4 is sandwiched between the lens 5 and the bobbin 3. The objective lens support member 4 is formed into a cylindrical shape substantially corresponding to the outer contour of the objective lens 5. The objective lens support member 4 has base and tip ends which are mounted on the lens bobbin 3 and the objective lens 5, respectively. The objective lens 5 is supported on the objective lens support member 4 so that it projects from the upper surface of the lens bobbin 3 along the optical axis of the objective lens 5. The objective lens 5 is supported on the lens bobbin 3 and the objective lens support member 4 and is mounted on the optical block unit 1a in a position where the light beam which is emitted from the optical block unit 1a is transmitted through the objective lens support member 4 is incident. Accordingly, the objective lens 5 emits the light beam which is emitted from the optical block unit 1a and is incident thereto as a light beam B which will be converged upon a point on the signal recording surface of the disc 203.

The disc 203 used in the present embodiment is an optical disc and comprises a disc substrate which is made of a synthetic resin material having a light transmitting ability such as polycarbonate resin, into a disc shape. A signal recording layer is formed as a thin film on at least one main side of the disc substrate. A disc hub 204, which is connected to the disc rotating drive mechanism 215, supports the disc 203 in the center thereof. The disc hub 204 is formed of a magnetic material such as a metal plate into a disc shape. An annular area between the outer periphery of the disc hub 204 and the outermost periphery of the disc substrate forms a signal recording area which is formed with the signal recording layer in which recording and/or reproducing of the informational signal is carried out by the optical pick up device 1.

The cartridge main body 201 which constitutes the disc cartridge 202 is formed by abut-bonding upper and lower square halves into a thin box that is large enough to rotatably house the disc 203. In other words, one side of the upper and lower main sides 201a and 201b of the cartridge main body 201, which face to the main side of the housed disc 203 has a length which is slightly longer than the diameter of the disc 203. The distance between the opposing inner surfaces of the main sides 201a and 201b, i.e. the thickness of the disc housing space formed in the cartridge main body 201 is slightly larger than the thickness of the disc hub 204.

The cartridge main body 201 is formed with a recording and/or reproducing opening 205 on the lower side 201b thereof. The recording and/or reproducing opening 205 is an elongated approximately rectangular through-hole. The opening 205 extends from the vicinity of the center of the lower main side 201b to the vicinity of one of the side edges of the lower main side and has a width which is slightly larger than the outer diameter of the objective lens 5. A part of the signal recording area which faces the lower main side 201b of the disc 203 is exposed in a radial direction of the disc 203 through the recording and/or reproducing opening 205. The optical pick-up device 1 irradiates the signal recording area with the light beam B via this recording and/or reproducing opening 205 to record and/or reproduce informational signals on the disc 203.

The lower main side 201b of the cartridge main body 201 is provided with an approximately circular chucking opening 206 in the center thereof. The lower side of the disc hub 204 is externally exposed through the chucking opening 206. The disc rotating drive mechanism 215 moves a disc table 208 supported on the rotary shaft of a spindle motor 207 into the cartridge main body 201 through the chucking opening 206 so that the disc 203 is chucked by attracting the disc hub 204 by the magnets provided on the disc table 208.

Figure 4:
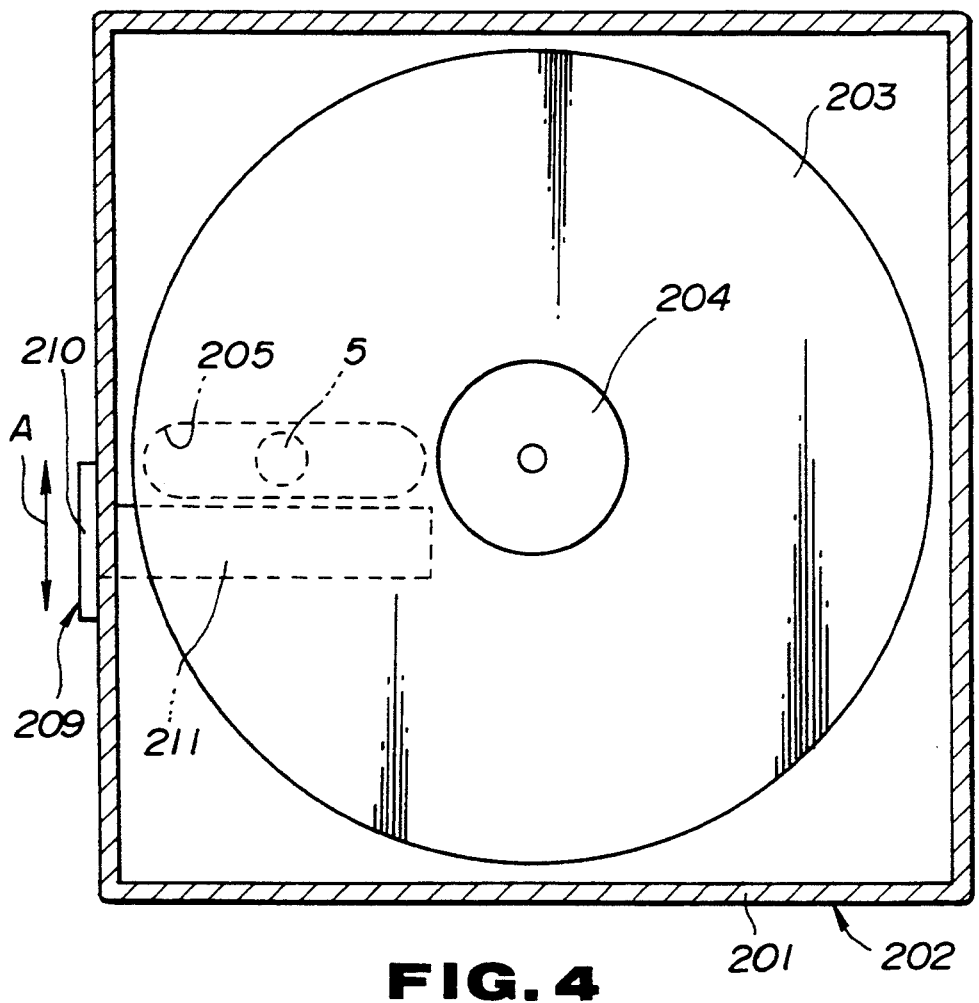
FIG. 4 is a plan view, partially in section, showing the disc cartridge.

The shutter member 209 is mounted on the thus formed cartridge main body 201 as shown in FIG. 4. The shutter member 209 is provided for opening and/or closing the recording and/or reproducing opening 205. The shutter member 209 comprises a slider portion 210, which is supported on the cartridge main body 201 along one side of the cartridge main body 201 and a shutter portion 211 for opening and/or closing the recording and/or reproducing opening 205. The shutter member 209 is integrally formed of a synthetic resin material such as polyacetal to possess an L-shaped section. The slider portion 210 which forms the shutter member 209 is formed into an elongated rectangular plate having a width substantially equal to the thickness of the cartridge main body 211. The shutter portion 201 is formed into a rectangular plate having a uniform thickness, which is larger in size than the recording and/or reproducing opening 205 and extends on the lower main side of 201b of the cartridge main body 201.

Figure 5:
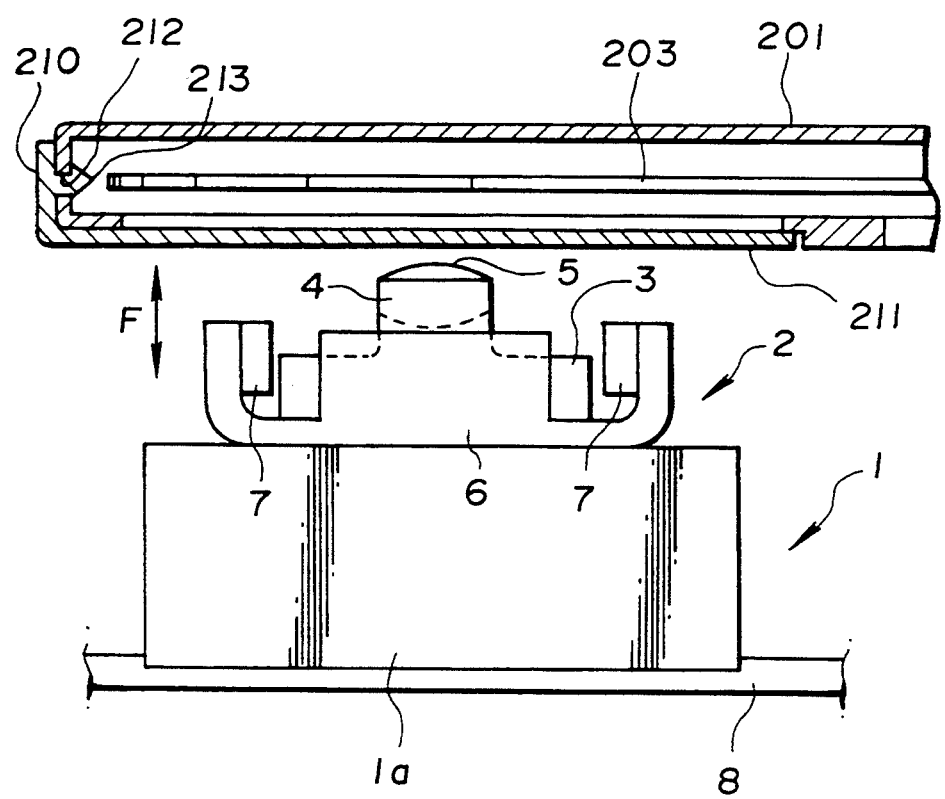
FIG. 5 is an enlarged longitudinal sectional view showing the optical pick up device and the disc cartridge when it is not in use.

As best seen in FIG. 5, the shutter member 209 is mounted on the cartridge main body 201 by engaging an engagement pawl 213 projecting on the inner side of the slider portion 210 with an engagement groove 212 formed on one side of the cartridge main body 201 so that the shutter member 209 is guided by the engagement groove 212 to slide in a direction of an arrow A in FIG. 4. The shutter member 209 is slidable between positions where the shutter portion 211 closes and opens the recording and/or reproducing opening 205.

Since the recording and/or reproducing opening 205 is formed so that it has a width slightly larger than the outer diameter of the objective lens 5 of the optical pick-up device 1, it suffices that the shutter portion 211 of the shutter member 209 also has a width slightly larger than the outer diameter of the objective lens 5. Accordingly, the need to make the cartridge main body 201 larger to provide moving area for the shutter member 209 205 is eliminated.

In the thus formed recording and/or reproducing apparatus of the present invention, a drive signal is not applied to the solenoids of the objective lens drive device 2 when the apparatus is not driven. Accordingly, the lens bobbin 3 which supports the objective lens 5 is retracted toward the optical block portion 1a as shown in FIG. 5. When the lens bobbin 3 is in the retracted position, the disc cartridge 202 can be slid in a horizontal direction over the optical pick-up device 1 without contacting the objective lens 5 when the disc cartridge 202 is loaded into the cartridge loading portion in the recording and/or reproducing apparatus.

When the disc cartridge 202 is not loaded in the recording and/or reproducing apparatus, the shutter member 209 is in a closed position so that the recording and/or reproducing opening 205 is closed by the shutter portion 211. In other words, dust and fingers are prevented from entering into the cartridge main body 201 by closing the recording and/or reproducing opening 205 with the shutter portion 211.

When the disc cartridge 202 is loaded in the recording and/or reproducing apparatus, the disc 203 is supported on the disc table 208 of the disc rotating drive mechanism 215. The shutter member 209 is slid toward a position in which the opening 205 is opened by a shutter opening mechanism disposed in the side of the recording and/or reproducing apparatus. The objective lens 5 of the optical pick-up device 1 faces the disc 203 supported on the disc table 208 through the opened recording and/or reproducing opening 205.

When the disc cartridge 202 is loaded into the recording and/or reproducing apparatus of the present invention and the spindle motor 207 of the disc rotating drive mechanism 215 is rotated so that recording and/or reproducing of information signals on and/or from the disc 203 is enabled by the optical pick-up device 1, a drive signal is applied to the solenoid of the objective lens drive device 2 to move the lens bobbin 3 toward the disc cartridge 202. The movement of the lens bobbin 3 causes the objective lens 5 to move into the cartridge main body 201 through the opened recording and/or reproducing opening 205. At this time, the objective lens 5 is remote from the signal recording area of the disc 203 by a given working distance determined by the optical characteristics of the objective lens 5 and faces thereto. The objective lens 5 converges the light beam emitted from the optical block unit 1a upon the signal recording area of the disc 203. In such a manner, writing and/or recording of informational signals to the signal recording area is carried out by the optical pick-up device 1 on exposure of the signal recording area of the disc 203 to the converged light beam B.

The recording and/or reproducing apparatus of the present invention transmits and receives informational signals to and from the optical pick-up device 1 via a signal processor which is located internally or externally of the apparatus for recording and/or reproducing information signal on the disc 203.

The recording and/or reproducing apparatus may be used with a so-called magneto-optical disc as well as with the above mentioned optical disc 203.

When the magneto-optical disc is utilized as a recording medium, the disc cartridge 202 is formed with recording and/or reproducing openings on both of the opposite main sides thereof. An optical pick-up device is moved into the recording and/or reproducing opening on one of the main sides while an external magnetic field generating device is moved into, the recording and/or reproducing opening on the opposite main side. Tn this case, a shutter member disposed on the disc cartridge 202 is formed into Σ-shaped section so that it has a pair of shutter portions enabling the recording and/or reproducing openings formed on the opposite main sides to be closed.

When a part of the signal recording area, of which is externally exposed through the recording and/or reproducing opening formed on the cartridge main body is irradiated with the light beam from the optical pick up device as mentioned above, only the objective lens of the optical pick-up device is moved toward the disc into the cartridge main body through the opening.

Accordingly, the recording and/or reproducing apparatus is capable of recording and/or reproducing informational signals on the disc by means of the optical pick up device even if the opening formed on the cartridge main body is sized so that only the objective lens of the optical pick up device can be moved through the opening. It is not necessary to provide a larger opening which allows the objective lens drive mechanism to move into the cartridge main body in order to shorten the distance between the objective lens of the optical pick up device and the disc, i.e. the working distance. Since the shutter member for opening and closing the opening 205 can be made compact, it is possible to reduce the moving area of the cartridge main body in which the shutter member is moved for opening and closing the opening and thus a compact disc cartridge on which the shutter member is mounted can be provided.

Briefly, the present invention provides a recording and/or reproducing apparatus which is capable of performing excellent recording and/or reproducing of informational signals on a disc housed in a disc cartridge without increasing the size of a disc cartridge for housing the disc and without difficulty in manufacturing.

We claim:

1. A disc drive apparatus for recording and/or reproducing informational signals on an optical disc housed within a disc cartridge when the disc cartridge is loaded into the disc drive apparatus, the disc cartridge having an opening which is exposed when the disc cartridge is loaded into the disc drive apparatus, the apparatus comprising:
    a disc table connectable to the optical disc when the optical disc is loaded into the disc drive apparatus;
    driving means for rotating the disc table;
    an optical pick-up device having a light source and an objective lens, the objective lens converging a light beam from the light source upon the optical disc along an optical axis; and
    lifting means for moving the objective lens into the disc cartridge through the opening only when the disc table is rotated.

2. The apparatus as defined in claim 1 wherein the lifting means moves the objective lens along the optical axis to focus the light beam on the optical disc.

3. The apparatus as defined in claim 2 wherein the lifting means is provided on the optical pick-up device.

4. The apparatus as defined in claim 2 wherein the lifting means comprises:
    cylindrically shaped, transparent lens support means for supporting the objective lens; and
    bobbin means for supporting the lens support means and for moving the lens support means along the optical axis.

5. The apparatus as defined in claim 1,
    wherein the cartridge opening is elongated, with its length extending radially of the disc and its width being only slightly larger than the diameter of the objective lens; and
    wherein the cartridge includes a shutter closing member which is in the shape of the cartridge opening.

6. In combination, a disc cartridge housing an optical disc and a disc drive apparatus for recording and/or reproducing informational signals on the optical disc when the disc cartridge is loaded into the disc drive apparatus, the disc cartridge having an opening which is exposed when the disc cartridge is loaded into the disc drive apparatus,
    wherein the disc drive apparatus includes a disc table connectable to the optical disc when the optical disc is loaded into the disc drive apparatus, driving means for rotating the disc table, an optical pick-up device having a light source and an objective lens, the objective lens converging a light beam from the light source upon the optical disc along an optical axis, and lifting mean for moving the objective lens into the disc cartridge through the opening when the disc table is rotated;
    wherein the cartridge opening is elongated, with its length extending radially of the disc and its width being only slightly larger than the diameter of the objective lens; and
    wherein the cartridge includes a shutter closing member which is in the shape of the cartridge opening.

7. The combination defined in claim 6, further comprising:
    a lens bobbin; and a cylindrical support member for supporting the objective lens so that the objective lens projects from a surface of the lens bobbin which is closest to the optical disc, the support member being transparent so that the light beam from the light source passes through the support member and the objective lens, and the support member having an outer diameter which is the same as the diameter of the objective lens.

* * * * *